United States Patent Office 2,764,420
Patented Sept. 25, 1956

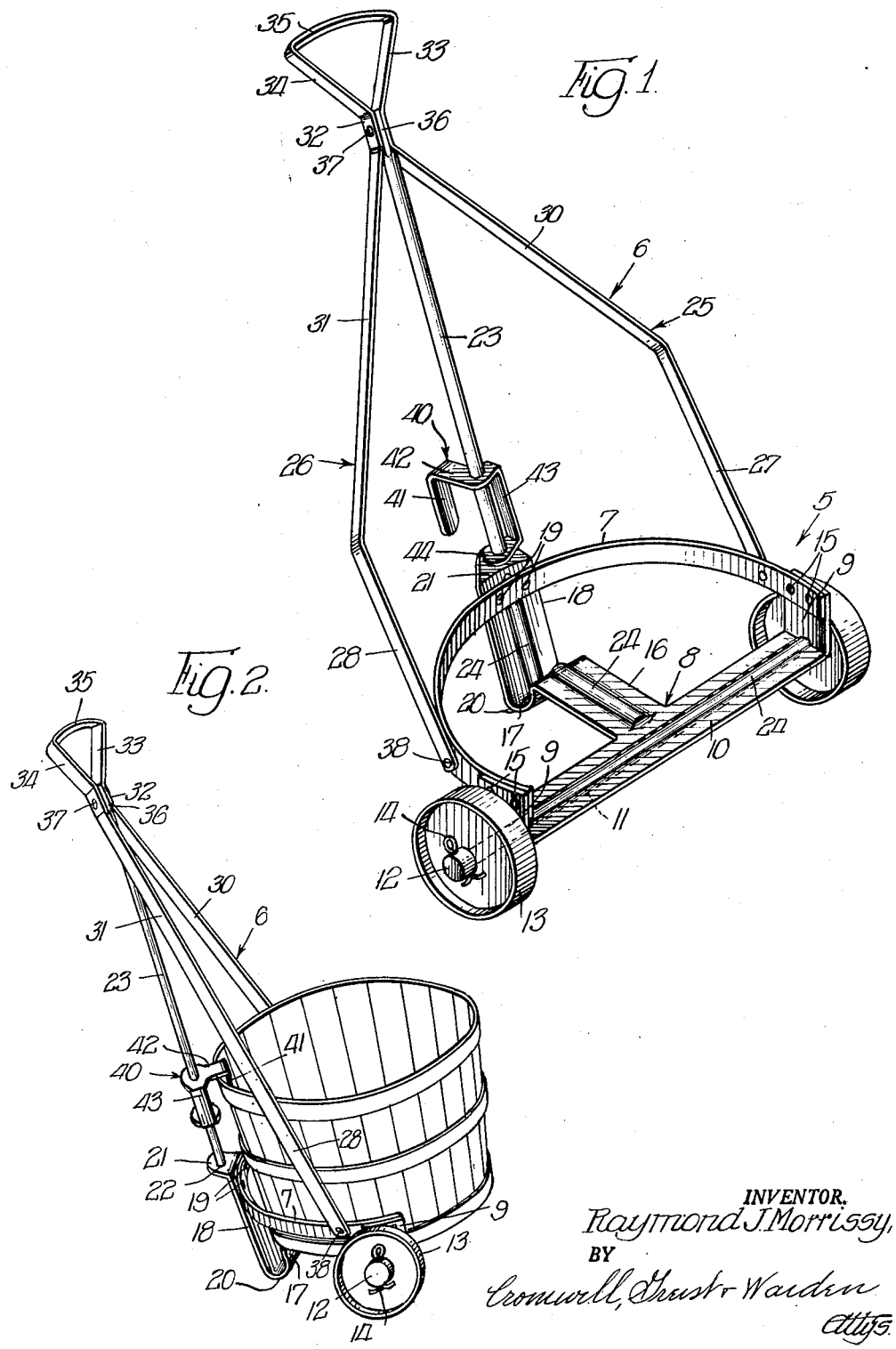

2,764,420

HAND CART

Raymond J. Morrissy, Delavan, Wis.

Application January 22, 1954, Serial No. 405,559

4 Claims. (Cl. 280—47.24)

This invention relates, generally, to a two-wheeled hand cart particularly adapted for supporting and moving upright containers having a downwardly projecting rim around the bottom such, for example, as bushel baskets, garbage cans, etc.

A primary object of the invention is the provision of such a utility cart, the component parts of which may be produced at low cost on a quantity production basis and which may be easily assembled into a rigid and rugged end item which is self-supporting in an upright condition with a container being supported thereon in such a manner that its center of gravity is to the rear of the wheels and the container is fully secured thereon so as not to fall off during movement.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a perspective view of a two-wheeled hand cart constituting one embodiment of the invention; and Fig. 2 is a second perspective view taken from one of the side angles and showing the manner in which a container is supported on the cart.

For purposes of description, the two-wheeled cart shown in the drawings can be considered as comprising a container-supporting base indicated generally at 5, and a combination container-supporting frame and handle upstanding from the base 5 and indicated generally at 6.

The base 5 includes a U-shaped member 7 which may be formed from suitable strap stock. A multi-section member, designated generally at 8, provides the platform of the base 5. The platform 8 has a front platform member 10 which extends across the front of the cart. The member 10 has upwardly turned end portions 9—9 which are riveted to the adjacent ends of the U-member 7 as indicated at 15—15.

A rod or axle 11 extends underneath the platform member 10 with the ends thereof projecting on opposite sides of the base 5 so as to provide spindles 12—12.

A pair of cart support wheels 13—13 are mounted on the spindles 12 and are retained in place thereon by cotter pins 14, for example.

The platform 8 also has a rearwardly extending member 16 which is integrally connected to the front platform member 10. At the rear, the horizontal member 16 integrally joins a U-shaped portion having a short front leg 17 and a long rear leg 18 joined at the bottom by a yoke portion 20. The upper end of the long leg 18 is suitably attached by rivets 19 to the middle of the U-shaped member 7 and has a rearwardly projecting portion 21 which is apertured as indicated at 22 (Fig. 2) for receiving the lower end of a rod 23 which forms a part of the upstanding frame and handle assembly 6.

The platform 8 is preferably stamped from a single piece of stock and is strengthened by stamping into it reinforcing ribs 24—24. It will be seen from Fig. 2 that the yoke portion 20 is at a level which is approximately even with the bottoms of the wheels 13 so as to serve as a rear support for the cart and cause it to stand by itself in an upright position. It will also be seen from Fig. 2 that the bottom rim of a container, e. g. bushel basket, catches over the angle formed between the rear end of the horizontal portion 16 and the short leg 17 thereby retaining such a container securely in place on the cart. It will be seen, therefore, that the platform 8 serves a plurality of functions and yet is simple and convenient to manufacture.

The upstanding frame and handle unit 6 comprises in addition to the rod 23, a pair of side members 25 and 26 having bottom end portions 27 and 28 and inwardly converging intermediate portions 30 and 31 which come together as indicated at 32. Above the juncture 32 where the converging portions 30 and 31 come together, each diverges into a short portion 33 and 34, respectively, which are joined together at the tops by an integral yoke portion 35. It will be seen that the portions 33, 34 and 35 together form a handle for the cart. The upper end of the rod 23 is flattened as indicated at 36 and fits in between the two side members 25 and 26 where they come together at 32. A bolt 37 passes through the two side members 25 and 26 and the intermediate flattened portion 36 at this point so as to hold this assembly together.

Preferably, the side members 25 and 26 are integrally formed of one piece of flat strap stock thereby minimizing the cost of the upstanding frame and handle.

The bottom ends of the side members 25 and 26 are attached to the opposite sides of the U-shaped member 7 by rivets as indicated at 38—38.

A hook member 40 is slidably mounted on the middle rod 23 and the downwardly projecting hook portion 41 thereof is adapted to hook over the upper rim of a container located on the cart as shown, for example, in Fig. 2. The hook member 40 may be formed from a single piece of flat stock and in addition to the downwardly projecting hook portion 41 comprises an upper horizontal portion 42, a vertical connecting portion 43 and a bottom laterally extending portion 44. The portions 42 and 44 are provided with registering holes whereby the hook 40 may slide up and down on the rod tube 23.

The cart construction shown in the drawing is particularly adapted for handling a common bushel basket although it will be understood that the same cart is also capable of and intended for handling large-sized garbage cans and other similar containers.

In addition to its simplicity, low manufacturing cost and ease of assembly, as pointed out above, the cart shown in the drawings also has other advantages. For example, a number of the empty carts may be nested together so as to occupy a minimum of floor space. A single cart or a group of the nested carts, when empty, may be conveniently moved by turning over the carts so that the U-shaped member 7 and platform 8 project above the wheels. In this way a number of the nested carts may be carried "piggy back" one on another. Such features are particularly desirable and advantageous when the carts are used in cold storages and in other places where baskets of produce are being handled in large numbers.

The embodiment of the invention described above in connection with the drawings may be modified in several obvious ways. For example, the wheels 13 may be replaced by rubber-tired wheels. The rivets may be replaced by nuts and bolts so as to allow the cart to be dismantled. If desired, the rivets may be replaced by welding.

It will be understood that these and other modifications and changes of a design nature may be made without departing from the spirit and scope of the invention. Ac-

What is claimed as new is:

1. A two-wheeled hand cart particularly adapted for supporting and moving an upright container of the type having a downwardly projecting rim around the bottom, said cart comprising a container-supporting base and a combined container-supporting frame and handle upstanding from said base; said container-supporting base comprising a generally U-shaped member which lies in an approximately horizontal position so as to fit around the back of an upright container of said type when supported on said base, downwardly projecting members on the outer ends of said U-shaped member, a horizontal front and transverse platform member extending between the bottom ends of said downwardly projecting members and on which the bottom of a container is adapted to rest, coaxially aligned spindles projecting from opposite ends of said horizontal extending member, a cart support wheel mounted on each of said spindles, rearwardly extending platform means the front end of which is connected to said transverse platform member and the rear end of which is connected to said U-shaped member at approximately the mid-point thereof, said rearwardly extending platform means having a horizontal platform portion which extends from said horizontal front member rearwardly to a short distance in front of and underneath the middle of said U-shaped member, and a container rim receiving U-shaped foot portion the front leg of which is shorter than the rear and attached at the top end to the rear end of said horizontal platform portion and the longer rear leg being attached at its top end to said U-shaped member, said U-shaped foot portion serving to support the rear of said cart in an upright position; said combined container-supporting frame and handle comprising two side members the bottom ends of which are attached to the opposite sides of said U-shaped member forwardly from the rear thereof, and handle means supported on the upper end of said side members.

2. The cart called for in claim 1 wherein said rearwardly extending platform means is integrally formed from a single piece of stock and said horizontal platform portion thereof is connected to said transverse platform member at approximately the mid-point thereof.

3. The cart called for in claim 1 wherein there is a rearwardly projecting and apertured ear on the upper end of said longer rear leg of said container rim receiving U-shaped foot portion and said combined container-supporting frame and handle includes a rod member the upper end of which is secured to the upper ends of said side members and the bottom end of which projects through the aperture in said apertured ear, and a hook providing member slidably mounted on said rod above said apertured ear and having a downwardly projecting hook portion adapted to fit over the top rim of a container resting in place on said cart.

4. The cart called for in claim 1 wherein said side members and handle means are integrally formed from one piece of stock, with the upper ends of said side members converging together and then diverging thereabove to form said handle.

References Cited in the file of this patent
UNITED STATES PATENTS

| | | |
|---|---|---|
| 800,445 | Hourihan | Sept. 26, 1905 |
| 2,078,119 | Benedict | Apr. 20, 1937 |
| 2,208,891 | Bowling | July 23, 1940 |
| 2,346,649 | Bilek et al. | Apr. 18, 1944 |
| 2,502,579 | McKibben | Apr. 4, 1950 |